2 Sheets--Sheet 1.
H. N. PROUT.
Hoeing-Attachments.
No. 148,845.  Patented March 24, 1874.
Fig. 1.
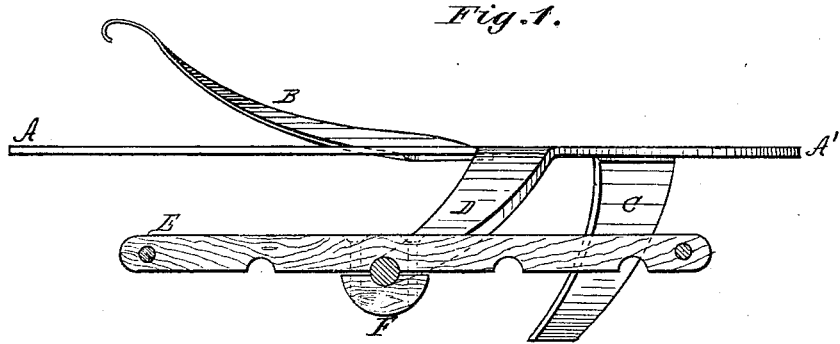
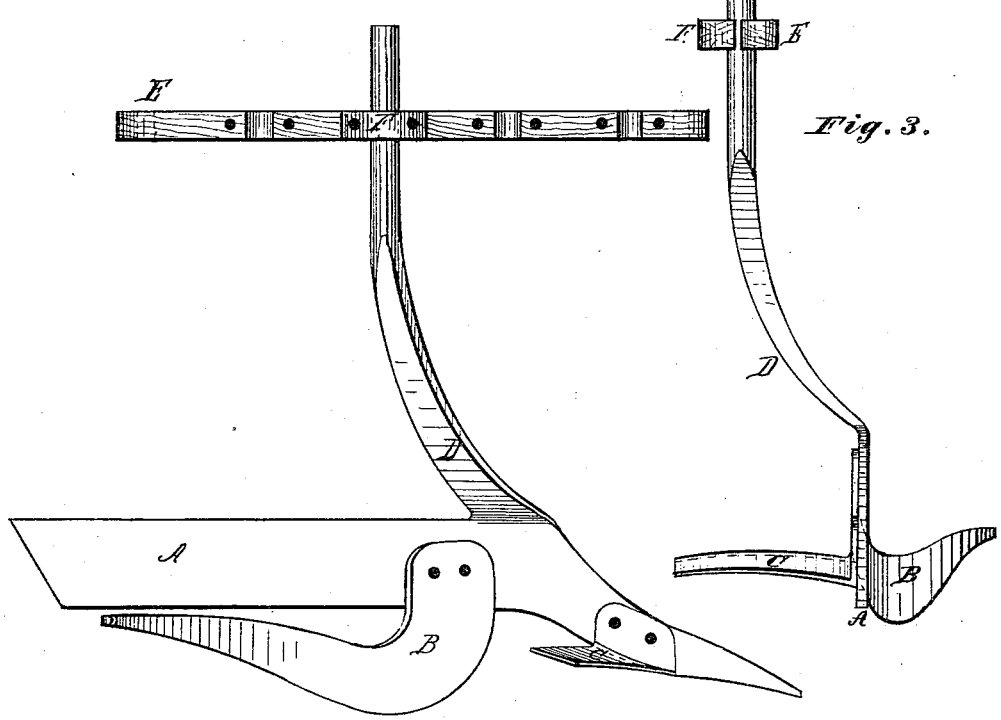
Witnesses.
Albert L. Dewey.
George W. Rose.
Inventor.
Horace N. Prout 2 Sheets--Sheet 2.

H. N. PROUT.
Hoeing-Attachments.

No. 148,845. Patented March 24, 1874.

Witnesses;
Geo. W. Rose.
Albert L. Dewey

Inventor;
Horace N. Prout

UNITED STATES PATENT OFFICE.

HORACE N. PROUT, OF WESTFIELD, MASSACHUSETTS.

IMPROVEMENT IN HOEING ATTACHMENTS.

Specification forming part of Letters Patent No. 148,845, dated March 24, 1874; application filed February 19, 1873.

*To all whom it may concern:*

Be it known that I, HORACE N. PROUT, of Westfield, in the county of Hampden and State of Massachusetts, have invented certain Improvements in Hoeing Attachments for Horse-Hoes, Plows, Cultivators, &c., of which the following is a specification:

The object of my invention is to provide a hoeing attachment capable of being adjusted to any plow or cultivator, and which shall work close up to the rows without damage to the growing plants, and thus avoid the necessity of hand labor in hoeing a crop after it has been worked with a cultivator; and the invention consists in the novel construction of parts, which I will now proceed to describe.

Figure 4:
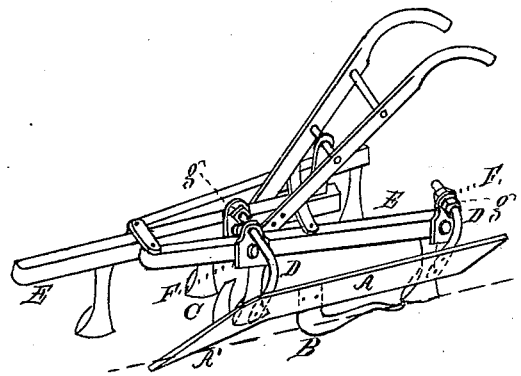
Figure 5:
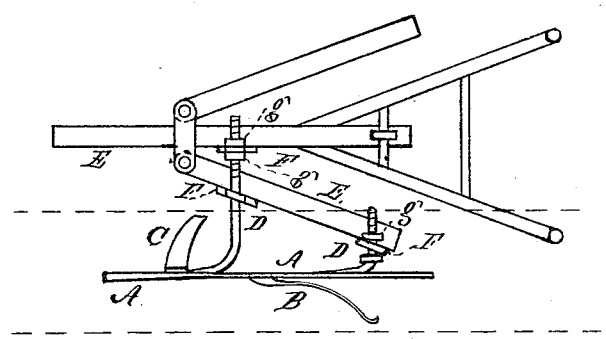

Figure 1 is a plan view of my invention, with section of cultivator-bar, to which it is attached. Fig. 2 is a side elevation of the same. Fig. 3 is a front elevation of the same, showing that end of the attachment which is at the right hand of Fig. 2. Fig. 4 is a perspective view, representing my invention as attached to a common cultivator with low bars, in which the standard D is shown bent at right angles, and secured by eyes on the top of the cultivator-frame. Fig. 5 is a plan view of the same.

A represents the land-side, having a descending angular point, marked A'. B represents a wing-spring, attached to the land-side A, by means of bolts or rivets, so as to be rigid or adjustable, as may be desired. The spring B extends downward under the land-side A, and has its lower edge made or profiled to correspond with the shape of the ridge or hill, as may be desired; and the height and shape of the hill or ridge may be varied by raising or lowering the point of the spring in the arc of a circle. This spring, after passing underneath the land-side A, is bent diagonally outward in circular form, as shown in Figs. 1 and 5. The knife C is attached to the angular point of A, and extends between the land-side and the cultivator to which the land-side is attached, the use of which is to cut the soil between the cultivator and its attached fixture. D is a standard (of which there may be two) for forming a connection with the machine to which this invention may be attached. E represents a part of the framework of the machine which carries the invention. F represents an adjustable slotted eye-bolt securing this machine to a cultivator. $a'$ represents the adjusting-nuts for standards D when bent at a right angle. The standard D supports and carries the hoeing attachment about four inches from the machine to which it is attached, so as to allow a space for the escape of stones and turf, which would otherwise choke and clog the same. The standards D are bent from the land-side A, so as to allow the leaves of the plants to pass freely over the top of the land-side.

By loosening the clamp-bolts E the land-side A may be raised or lowered as circumstances may require. The attachment may also be adjusted laterally, when the standard is bent at right angles, by sliding the standards D through the eye $d$ of the slotted adjustable support F, and firmly secured in the required position by the check-nuts $g'\ g'$, as shown in Figs. 4 and 5.

The land-side A is made of a thin narrow strip of iron or steel, and its angular sharp point runs near the plants, and about one-half of an inch under the soil, and raises the bottom leaves upon its inclined plane, and over the top of the land-side, the side of which, at the same time, keeps the dirt which is turned up by the plow or cultivator from passing over and covering the plants or their leaves.

By the peculiar action of the spring B the weeds are drawn under the surface by their roots, and thereby destroyed; and, at the same time, by the action of the spring, the fresh soil is carried up to and around the plants, the shape of the bottom edge of the spring at the same time hilling or ridging one side of the row, the other side being finished, of course, by driving the team down the next row.

I do not wish to confine myself to the use of the spring B, in combination, either directly or indirectly, with the land-side and point A; but may use it attached directly to a cultivator-bar or the mold-board of a plow.

I claim and desire to secure by Letters Patent—

1. The hoeing attachment to a cultivator above described, consisting of the land-side A, with angular point A', provided with the wing-spring B, and curved horizontal cutter C, in combination with the standard D, whereby the whole is attached to a plow or cultivator, as and for the purpose described.

2. The wing-spring B, constructed as described, and attached to the land-side A, or secured directly to a cultivator-beam or mold-board of a plow, as and for the purpose set forth.

HORACE N. PROUT.

Witnesses:
ALBERT L. DEWEY,
HENRY FULLER.